US010855441B2

(12) United States Patent
Norrman et al.

(10) Patent No.: US 10,855,441 B2
(45) Date of Patent: Dec. 1, 2020

(54) METHOD OF GENERATING A PSEUDONYM ASSOCIATED WITH A COMMUNICATION DEVICE, A NETWORK NODE, COMPUTER PROGRAM AND COMPUTER PROGRAM PRODUCT

(71) Applicant: TELEFONAKTIEBOLAGET LM ERICSSON (PUBL), Stockholm (SE)

(72) Inventors: Karl Norrman, Stockholm (SE); Jari Arrko, Kauniainen (FI); Elena Dubrova, Sollentuna (SE); Mats Näslund, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 86 days.

(21) Appl. No.: 15/781,260

(22) PCT Filed: Dec. 18, 2015

(86) PCT No.: PCT/EP2015/080414
§ 371 (c)(1),
(2) Date: Jun. 4, 2018

(87) PCT Pub. No.: WO2017/102020
PCT Pub. Date: Jun. 22, 2017

(65) Prior Publication Data
US 2018/0367296 A1 Dec. 20, 2018

(51) Int. Cl.
*H04L 29/06* (2006.01)
*H04L 9/06* (2006.01)
(Continued)

(52) U.S. Cl.
CPC ........ *H04L 9/0618* (2013.01); *G06F 21/6254* (2013.01); *H04L 63/0414* (2013.01);
(Continued)

(58) Field of Classification Search
CPC ............ G06F 21/6254; H04L 63/0421; H04L 2209/42
See application file for complete search history.

(56) References Cited

U.S. PATENT DOCUMENTS

2004/0098625 A1* 5/2004 Lagadec ............... G06Q 30/02
726/4
2004/0193891 A1 9/2004 Ollila
(Continued)

FOREIGN PATENT DOCUMENTS

WO 2010034507 A1 4/2010

OTHER PUBLICATIONS

International Search Report and Written Opinion issued in Application No. PCT/EP2015/080414 dated Jun. 8, 2016, 8 pages.
(Continued)

*Primary Examiner* — Thaddeus J Plecha
(74) *Attorney, Agent, or Firm* — Rothwell, Figg, Ernst & Manbeck, P.C.

(57) ABSTRACT

A method (40) of generating a pseudonym associated with a communication device (11) is disclosed. The method (40) is performed in a network node (13) of a communications system (10) and comprises generating (41) a pseudonym embryo based on one or more elements of a sequence ($S_1$, $S_2$, . . . , $S_n$), obtaining (42) the pseudonym as output of a masking operation applied to the pseudonym embryo, wherein the masking operation comprises a one-to-one mapping, and transmitting (43) the pseudonym to the communication device (11). A corresponding network node (13), computer program and computer program product are also disclosed.

18 Claims, 3 Drawing Sheets

(51) Int. Cl.
  *H04W 12/02* (2009.01)
  *G06F 21/62* (2013.01)
  *H04W 12/00* (2009.01)

(52) U.S. Cl.
  CPC ...... *H04L 63/0421* (2013.01); *H04L 63/0428* (2013.01); *H04W 12/02* (2013.01); *H04L 2209/42* (2013.01); *H04W 12/00518* (2019.01)

(56) References Cited

U.S. PATENT DOCUMENTS

| | | | | |
|---|---|---|---|---|
| 2008/0154782 | A1* | 6/2008 | Kang | G06Q 20/04 705/74 |
| 2011/0150225 | A1* | 6/2011 | Minematsu | H04L 9/002 380/277 |
| 2012/0257753 | A1* | 10/2012 | Ochikubo | H04W 12/02 380/270 |
| 2013/0191650 | A1* | 7/2013 | Balakrishnan | G06F 21/6227 713/190 |
| 2014/0229339 | A1* | 8/2014 | Massiere | G06Q 20/3229 705/26.81 |
| 2015/0156012 | A1* | 6/2015 | Alahmadi | H04L 9/0631 380/274 |
| 2016/0353497 | A1* | 12/2016 | Oakes | H04L 12/6418 |
| 2018/0159584 | A1* | 6/2018 | Zhang | H04B 1/525 |
| 2018/0177025 | A1* | 6/2018 | Kumar | F21V 23/0471 |
| 2018/0303396 | A1* | 10/2018 | Wild | A61B 5/4884 |

OTHER PUBLICATIONS

3GPP, 3rd Generation Partnership Project; Technical Specification Group Services and System Aspects; Rationale and track of security decisions in Long Term Evolved (LTE) RAN / 3GPP System Architecture Evolution (SAE); (Release 9), 3GPP TR 33.821, V9.0.0, Jun. 2009. (20 pages).

Dubrova, E.: "A Scalable Method for Constructing Galois NLFSRs With Period 2n-1 Using Cross-Join Pairs", IEEE Transactions of Information Theory, vol. 59 (1), Jan. 1, 2013, 7 pages.

Dubrova, E.: "Generation of full cycles by a composition of NLFSRs", Des. Codes Cryptogr. (2014) 73, pp. 469-486.

Klimov, A. et al.: "Cryptographic Applications of T-Functions", Computer Science Department, The Weizmann Institute of Science, Rehovot 76100, Israel, M. Matsui and R. Zuccherato (Eds.): SAC 2003, LNCS 3006, pp. 248-261, 2004.

* cited by examiner

METHOD OF GENERATING A PSEUDONYM ASSOCIATED WITH A COMMUNICATION DEVICE, A NETWORK NODE, COMPUTER PROGRAM AND COMPUTER PROGRAM PRODUCT

CROSS REFERENCE TO RELATED APPLICATION

This application is a 35 U.S.C. § 371 National Stage of International Application No. PCT/EP2015/080414, filed Dec. 18, 2015, designating the United States, the disclosure of which is incorporated by reference.

TECHNICAL FIELD

The technology disclosed herein relates generally to privacy in telecommunications systems, and in particular to a method of generating pseudonyms for communication devices, and to a network node, computer programs and computer program products.

BACKGROUND

Telecommunication systems, e.g., second and third Generation mobile telecommunications technologies (2G, 3G) and Long Term Evolution (LTE), use pseudonyms to protect the privacy of a user of a wireless communication device (in the following also denoted User Equipment, UE). Typically, both the user as well as the UE will be associated with various identifiers. However, any identifier of the UE can in most cases be logically mapped to an identifier (an "alias") of the user. Conversely, any identifier primarily associated with the user may, in electronic communications be exposed through transmissions (by the UE) comprising that user identifier. Therefore, the UE and user identifiers may, to different levels, be logically corresponding to one another and be subject to similar privacy considerations with respect to the user. In the following, the term (device/UE) identifier will be used to denote an identifier used in transmissions to/from a UE, regardless of whether the primary use of the identifier is to serve as an identifier for the user or the UE itself. By protecting the confidentiality of such an identifier, the privacy of the user (also denoted subscriber herein) of the UE is also protected (explicitly or implicitly). The identifier associated with a UE, and thus associated with the UE user, is in 3rd Generation Partnership Project (3GPP) called an International Mobile Subscriber Identity (IMSI). The IMSI is stored on a Universal Subscriber Identity Module (USIM), which typically resides in a smart-card inserted in the UE. The IMSI is also stored in the Home Subscriber Server (HSS) in the subscriber's home network. The pseudonym is denoted in different ways in different telecommunication systems; for instance, Temporary Mobile Subscription Identifier (TMSI) and Packet TMSI (P-TMSI). In the following, the IMSI and the TMSI are used purely as examples of the identifier and the pseudonym.

The UE uses the IMSI or the pseudonym when initiating communication with a controlling network node, such as a Mobility Management Entity (MME) in LTE or a General packet radio service (GPRS) Support Node (SGSN) in 2G or 3G systems. When the UE does not have a pseudonym available, it has to fall back to using its IMSI for identification towards the network. This may for instance be the case the first time the UE attaches to the network.

The controlling network node assigns pseudonyms to the UE. Pseudonyms can be re-assigned frequently in order to make it more difficult for an attacker eavesdropping traffic on the air interface to correlate different messages with a given UE (and thus potentially also with a given user).

FIG. 1 illustrates this known method for assigning pseudonyms to a UE 1. In the first message (arrow A1) the UE 1 has no access to a TMSI and hence uses the IMSI to identify itself to the controlling network node 2. The controlling network node 2 then requests (arrow A2) authentication information for the subscriber with the given IMSI and receives (arrow A3) the information in response from the subscriber's HSS 3. Next, the controlling network node 2 sends an authentication request (arrow A4) to the UE 1, which responds (arrow A5) by an authentication response. The controlling network node 2 and the UE 1 both also establish security keys, e.g., an encryption key, in this process (arrows A7 and A6, respectively). The controlling network node 2 generates (arrow A8) a pseudonym P, here exemplified by TMSI, and associates the pseudonym P with the corresponding IMSI. This association may, for instance, comprise creating a local memory or database entry, enabling converting between IMSI and TMSI, back and forth as required. The controlling network node 2 then sends (arrow A9) the pseudonym P encrypted, Enc(P), to the UE 1. The UE 1 can thereafter use the assigned pseudonym P (TMSI) when subsequently contacting (arrow A10) the network. To further enhance the user privacy the controlling network node 2 can, from time to time, assign (arrows A11 and A12) new pseudonyms P' (e.g. TMSIs associated with the IMSI) to the UE, which then uses (arrow A13) the new TMSI when contacting the network. The first message sent by the UE 1 includes the long-term identifier IMSI, while subsequent messages instead include the pseudonyms P, P' and so on that are assigned to the UE 1 by the controlling network node 2.

This mechanism for assigning pseudonyms to UEs is specified for the current telecommunications systems such as e.g. 4G/LTE. However, the specifications do not prescribe how to generate the pseudonyms. The same is true also for the Extensible Authentication Protocol (EAP), which is another system using pseudonyms in a similar manner, used e.g. in some Wireless Local Area Network (WLAN) networks. There are indications suggesting that the pseudonyms in current implementations are generated in a predictable way, which puts the subscribers' privacy at risk. Similar issues may exist for EAP implementations.

There is a need for generating strong pseudonyms that are difficult to break, thereby preventing attackers from breaching the privacy of users.

SUMMARY

An objective of the present teachings is to enable efficient generation of strong pseudonyms that result in increased privacy protection. Another objective is to enable an efficient management of the pseudonyms, e.g. in view of avoiding pseudonym collisions.

The objective is according to an aspect achieved by a method of generating a pseudonym associated with a communication device. The method is performed in a network node of a communications system and comprises: generating a pseudonym embryo based on one or more elements of a sequence; obtaining the pseudonym as output of a masking operation applied to the pseudonym embryo, wherein the masking operation comprises a one-to-one mapping; and transmitting the pseudonym to the communication device.

The method brings about several advantages. For instance, by generating the sequence in an efficient way, and generating the pseudonym embryo based thereon, it is ensured that previously unused pseudonym embryos are generated. Further, the pseudonyms, obtained based on the pseudonym embryos, are computationally indistinguishable from randomly generated values, and the method thereby provides an increase in user identity privacy. The seemingly random pseudonym makes it more difficult for attackers to breach the user's privacy. The method provides an efficient mechanism for generating pseudorandom identifiers to a communication device, in particular a wireless communication device, identifiers which the communication device may use to identify itself to a network node without having to expose its static long-term identifier, which may be traced rather easily in particular over an air interface.

The objective is according to an aspect achieved by a computer program for a network node for generating a pseudonym associated with a communication device. The computer program comprises computer program code, which, when executed on at least one processor on the network node causes the network node to perform the method as above.

The objective is according to an aspect achieved by a computer program product comprising a computer program as above and a computer readable means on which the computer program is stored.

The objective is according to an aspect achieved by a network node for generating a pseudonym associated with a communication device. The network node is configured to: generate a pseudonym embryo based on one or more elements of a sequence; obtain the pseudonym as output of a masking operation applied to the pseudonym embryo, wherein the masking operation comprises a one-to-one mapping; and transmit the pseudonym to the communication device.

Further features and advantages of the present teachings will become clear upon reading the following description and the accompanying drawings.

DETAILED DESCRIPTION

Figure 1:
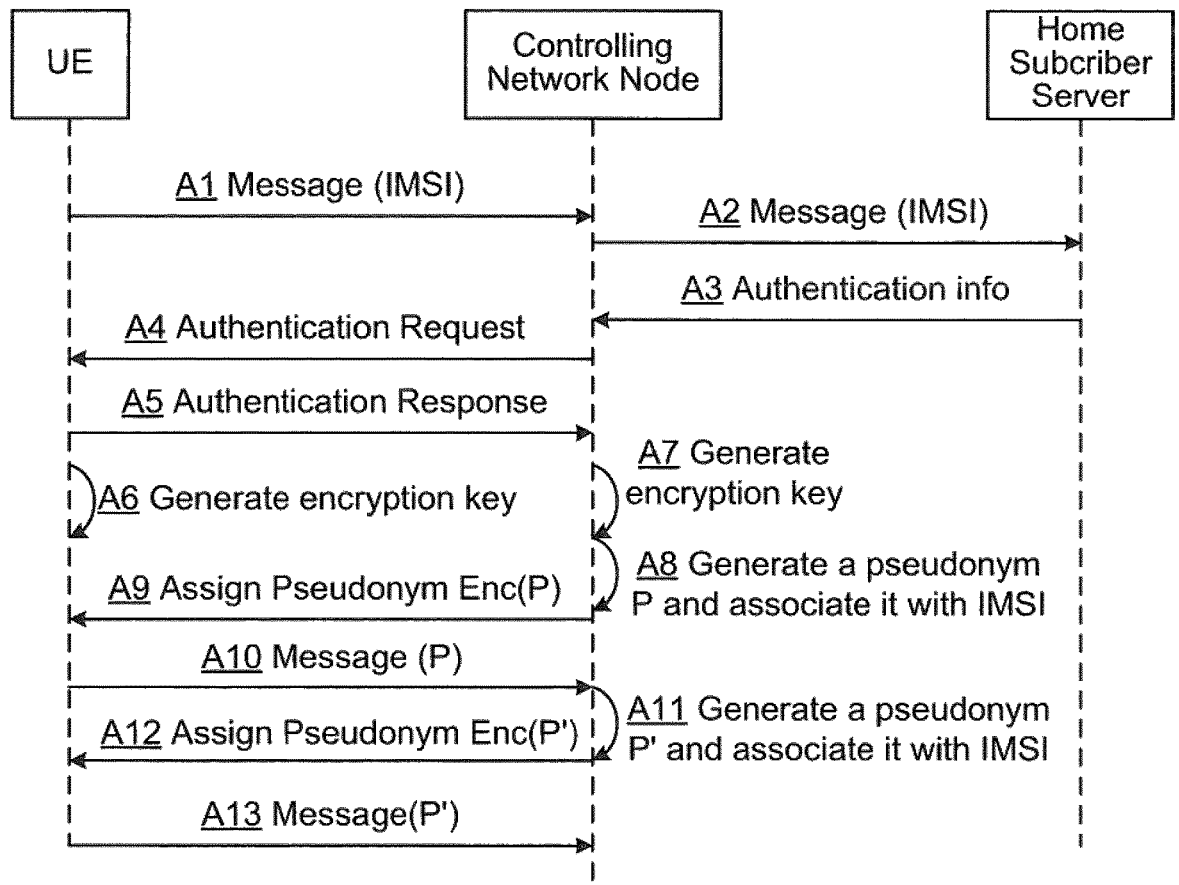
FIG. 1 is a signaling diagram showing a conventional method of assigning pseudonyms.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

The construction of the pseudonym determines the strength of the privacy protection. Ideally the pseudonyms should be indistinguishable from a random bit-string. A straightforward approach is therefore to randomly generate pseudonyms in the controlling network node 2, assign and transmit these to the UE 1 over a confidentiality protected (e.g. encrypted) channel. The controlling network node 2 can then keep an association (e.g. mapping table) between the assigned pseudonyms and the corresponding IMSIs. When the controlling network node 2 receives a message comprising a pseudonym, it can use the mapping table to identify the corresponding IMSI and thus identify the resources necessary for communication with the UE 1. The resources could for instance be a set of security keys and protocol state. This approach produces pseudonyms that are difficult to predict and correlate, but it also suffers from some drawbacks.

By generating the pseudonyms randomly, there is a risk that more than one UE 1 is assigned the same pseudonym, i.e., two or more pseudonyms collide. If that happens, the controlling network node 2 cannot uniquely identify the source of messages originating from those UEs using the particular pseudonym and the mapping table.

An approach solving this collision problem is to ensure that a generated pseudonym does not collide with a previously used one before assigning it to a UE 1. The generation of such pseudonyms could be performed by generating a fresh value and then calculating the pseudonym from the fresh value and a secret shared between the UE 1 and the controlling network node 2 using a one-way function, e.g., a hash function. The controlling network node 2 may keep track of all used pseudonyms and should a newly generated pseudonym turn out to be in use, the controlling network node 2 generates a new fresh value and generates yet another pseudonym. This procedure is repeated until an unused pseudonym is generated. Once an unused pseudonym is generated, the controlling network node 2 provides the fresh value to the UE 1, and the UE 1 can calculate the same pseudonym; alternatively, the controlling network node 2 transmits the unused pseudonym to the UE 1 over a confidentiality protected channel.

While this latter approach circumvents the problem of colliding pseudonyms in addition to making it difficult to predict, it quickly becomes inefficient. As the number of used pseudonyms increases in relation to the overall available namespace of pseudonyms, the chance of picking an unused pseudonym by uniformly selecting a fresh value goes to zero. This implies that the time for generating new pseudonyms statistically increases for each new assignment.

Briefly, the present teachings provide a method and network node for efficient generation of strong pseudonyms. The pseudonyms generated provide strong privacy protection, and yet enable an efficient management e.g. in view of avoiding pseudonym collisions. In various embodiments, an efficient method in a network node and a network node for generating pseudonyms, which are pseudo random, are provided. The pseudonyms may, in contrast to prior art, be generated with constant time performance for each generated pseudonym. That is, the time to generate a new pseudonym does not grow with the number of pseudonyms in use. The teachings are applicable as a method of generating pseudonyms in conventional systems such as LTE, 2G, 3G, future 5G systems, and also in EAP-based systems like WLAN. In conventional systems, the role of the network node may be taken by, for example, an MME, Mobile Switching Center (MSC), or an SGSN, and the pseudonym may, for instance, be a TMSI, or a P-TMSI.

Figure 2:
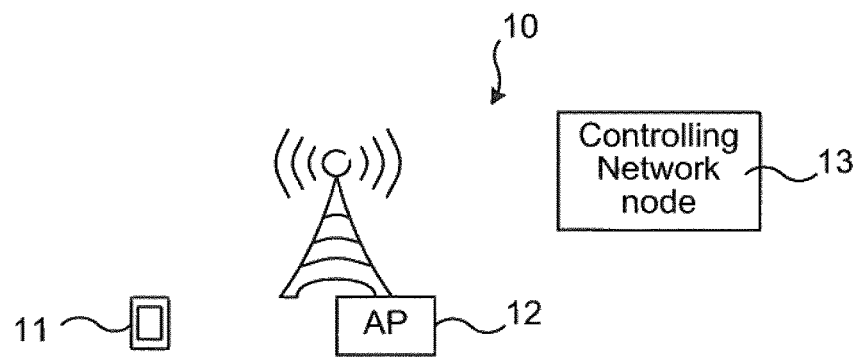
FIG. 2 is an exemplary environment in which embodiments of the present teachings may be implemented.

FIG. 2 illustrates an environment in which embodiments according to the present teachings may be implemented. The communications system 10, e.g. a 2G, 3G or LTE system, comprises a communication device 11, in the following exemplified by a UE. The UE 11 communicates via a radio access node 12 (denoted access point, AP, in the figure), which may be denoted differently depending e.g. on radio access technology, e.g. base station, evolved NodeB, or eNB to mention a few examples. The radio access node 12 provides wireless communication for UEs 11 residing within its coverage area. The radio access node 12 may control one or several geographical coverage areas, e.g. cells or sectors.

The communications system to comprises various other network nodes as well, which may also be denoted differently depending on the communication system at hand. For instance, the communications system to may comprise entities such as the earlier mentioned MME, MSC or SGSN. In FIG. 2 a network node is illustrated denoted controlling network node 13, which may, for instance, comprise the MME, MSC or SGSN and in which embodiments according to the present teachings may be implemented. It is noted that the network node generating the pseudonym may, in other embodiments, comprise a server or other entity on the Internet e.g. according to a cloud computing model. The communications system to may in such embodiments then, for instance, comprise a packet data network, gateways for communication between e.g. MME and a server in the packet data network.

Figure 3:
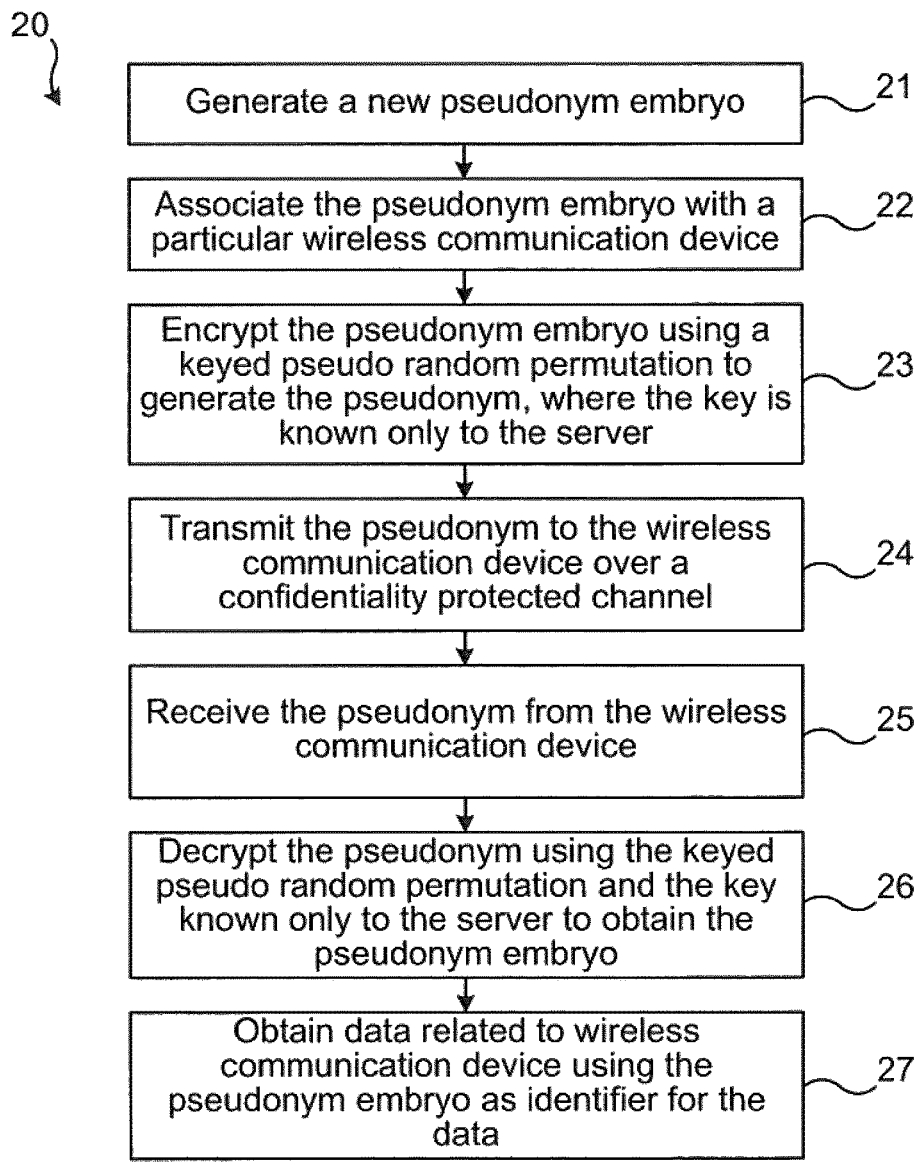
FIG. 3 is a flow chart illustrating various aspects of the present teachings.

FIG. 3 is a flow chart illustrating various aspects of the present teachings. In particular, FIG. 3 illustrates steps of a method 20 for generation of pseudo random pseudonyms. It is noted that FIG. 3 in fact illustrates various embodiments, as will become clear from the below description. The term "pseudonym embryo" is used herein and refers to a starting point or origin of a pseudonym to be created. The pseudonym embryo, or root, is in turn based on one or more values of a sequence of values. The pseudonym embryo may also be seen as and denoted pseudonym pre-image or pseudonym template.

Initially, the network node, in the following exemplified by and denoted controlling network node 13, generates (box 21) a pseudonym embryo which has not been previously used. This may be achieved by using an efficiently generable sequence of values, for example, the natural numbers 1, 2, 3, . . . and taking, for creating each pseudonym embryo, the next unused value in the sequence. The pseudonym embryo is generated based on at least one element of the sequence of values. There are no requirements on the randomness properties of the pseudonym embryo; it only needs to be unused. In some embodiments a T-function is used for generating the sequence of values. As another example, in other embodiments a Feedback Shift Register (FSR) is used for generating the sequence of values, wherein the sequence of values corresponds to the sequence of states of the FSR.

According to the present teachings it is not necessary to check the uniqueness of the pseudonym embryos, since they are unique by construction. In addition, the pseudonyms themselves, obtained based on the pseudonym embryos, are also unique by construction (as described below with reference to box 23). The pseudonyms are thereby also cryptographically strong and cannot be efficiently distinguished from random values. The pseudonym embryos may operate on a sufficiently large value space using merely increasing integers whereby a sufficient number of pseudonyms is provided (and checking for uniqueness is not necessary). A namespace is sufficiently large when all (active) users can be assigned a respective (unique) pseudonym.

Next, in box 22 the generated pseudonym embryo is associated with a particular UE 11. The generated pseudonym embryo may for instance be associated with a context of the UE, or the IMSI of a UE. In LTE, for instance, the MME associates the UE 11 with the pseudonym (TMSI), and hence also uses the IMSI as an identifier for the UE context. The pseudonym (TMSI) is thus associated with the IMSI.

In box 23, in order to generate the pseudonym corresponding to the pseudonym embryo, the controlling network node 13 applies a masking operation to the generated pseudonym embryo. The masking operation may be seen as a conversion operation or transformation operation, in which the pseudonym embryo is "hidden" or "masked". In such masking operation, the pseudonym embryo may be encrypted. The masking operation should comprise a one-to-one mapping. The mapping may be seen as an association between the pseudonym embryo and the pseudonym. A one-to-one mapping f may be defined as a mapping wherein forward mapping f is computationally feasible and the inverse mapping $f^{-1}$ is computationally infeasible. Such mapping is known as a one-way mapping. Infeasible means that it is computationally infeasible to perform e.g. the inverse mapping $f^{-1}$. Such a one-to-one one-way mapping is also denoted a cryptographic transformation. For a one-to-one mapping, the plaintext is uniquely determined by the key and ciphertext and potentially also initialization data (often referred to as an Initialization Vector) for the algorithm computing the mapping. Stated differently, for the one-to-one mapping the input (the pseudonym embryo) is uniquely determined by the output (the pseudonym). In some embodiments, the mapping f may depend also on a key, known e.g. only to the controlling network node 13. In such case, the mapping f is required to be one-to-one for each fixed key. Computing f for a given key (f being a keyed function) can be considered an encryption of the pseudonym embryo, and computing $f^{-1}$ can be considered a decryption of a pseudonym.

In some embodiments, the masking operation comprises applying a keyed Pseudo Random Permutation (PRP) to the pseudonym embryo. The PRP is preferably keyed by a key known only to the controlling network node 13 as this increases the security. However, in other embodiments, the PRP is not a dynamically keyed operation. Since the PRP is a one-to-one mapping and since the pseudonym embryo has not been previously used, the PRP will generate a pseudonym that has not been previously used. The controlling network node 13 then associates a long-term identifier for the UE 11 with the pseudonym and/or the pseudonym embryo. This long-term identifier of the UE 11 may, as for the association between the pseudonym embryo and UE, comprise the IMSI.

Existing methods for generating pseudonyms that are sufficiently strong often require storing all used (pseudo) randomly generated pseudonyms, and/or require checking whether a pseudonym has been previously used before assigning it. The latter becomes slow as the number of assigned pseudonyms grows and the time to generate a pseudonym therefore increases. In contrast to this, since the pseudonym embryo according to the present teachings has not been previously used the time to generate a pseudonym can be kept constant, in contrast to prior art wherein all used pseudonyms need to be kept track of in order to avoid collisions, i.e. avoid users trying to identify themselves with the same pseudonym. Further, the generation of pseudonyms according to the present teachings provides pseudonyms that are indistinguishable from randomly generated values, whereby user privacy is improved.

In box 24, the controlling network node 13 transmits the pseudonym to the UE 11 over a confidentiality protected channel. The UE 11 uses the pseudonym as an identifier when contacting the network.

When, in box 25, the controlling network node 13 receives the pseudonym from the UE 11, the controlling network node 13 uses the pseudonym to identify the long-term identifier of the UE 11 according to the association created in box 23.

In box 26, the controlling network node 13 decrypts the received pseudonym by using the inverse of the same one-to-one masking operation as was used for masking the pseudonym embryo. The terms "encrypt" and "decrypt" thus refer to applying the masking operation, e.g. PRP, and its inverse, respectively. For instance, if the masking operation used was the mentioned keyed PRP, then the controlling network node 13 decrypts the pseudonym using the keyed PRP and the key known by the controlling network node 13. Thereby the controlling network node 13 is able to obtain the pseudonym embryo.

In box 27, the controlling network node 13 obtains data related to the wireless communication device 11 by using the pseudonym embryo as identifier for the data. Examples of such data comprise e.g. a protocol state such as a set of security keys, message sequence numbers, selected encryption algorithms, or other forms of information used for mobility, service delivery or subscription management. It is noted that this last step is optional, merely illustrating how the pseudonym is typically used in a telecommunication system.

It is noted that the pseudonym generation according to the present teachings does not prevent an implementer of the controlling network node (e.g. MME, MSC or SGSN), to embed structure in the pseudonyms if desired for any reason. That is, the pseudonyms may be mapped to a structure. The controlling network node 13 may keep a table mapping the pseudonyms to identifiers (that contain the desired structure) for the UEs.

Pseudonym embryos and pseudonyms for all UEs may be generated from the same sequence, same PRP (or other masking operation) and same key (if any). The pseudonym used in many communication systems 10, in particular wireless communication systems, is 32 bits long (four octets). The pseudonym embryo as well as the corresponding pseudonym may therefore, in various embodiments, be 32 bits long. The pseudonym being 32 bits long would give a pseudonym space of 232 unique pseudonyms. This is a sufficiently large space for having a zero risk of pseudonym collisions, or a very low risk of pseudonym collisions in case the sequence generating the pseudonym embryo should be reused after some time.

As mentioned earlier, the pseudonym embryo may be obtained by starting with the next number in a sequence of integers. For instance, a first pseudonym embryo may be the sequence 1, 2, 3 giving a first pseudonym. When a pseudonym is to be generated next time, then the pseudonym embryo may instead start with the next number, in this case 2, i.e. the pseudonym embryo 2, 3, 1. In other embodiments, only one or few elements of the generated sequence are used as the pseudonym embryo. As also mentioned earlier, a T-function or a Feedback Shift Register (FSR) may be used for generating the sequence of values.

Examples of functions for generating integer sequences comprise applying
- the function f(x):=x*x to the integer sequence x=1, 2, 3, . . . , (i.e. the sequence of values comprising 1, 4, 9, 16, . . . ) or
- the function g(x):=−a*x−b, for fixed constants a and b, to the integer sequence x=−1, −2, −3, . . . , (i.e. the sequence of values comprising a−b, 2a−b, 3a−b, 4a−b, . . . ) or
- by simply taking successive natural numbers 1, 2, 3 . . .
- by taking American Standard Code for Information Interchange (ASCII) characters/strings in some lexical order, e.g. "a", "b", "c", . . . .

Integer sequences may be calculated modulo some integer as long as numbers in the sequence are not being used by (for) a communication device 11 when the numbers are repeated. It is realized that many alternatives exists for obtaining the sequence of values based on which the pseudonym embryo is generated. The requirement is that the pseudonym embryo is unique. The uniqueness (and the one-to-one mapping property of the masking operation) guarantees that the pseudonym corresponding to the pseudonym embryo is not in use by some communication device 11 when being generated.

The above may be summarized as: obtain (e.g. generate or determine) a sequence of values $S_1, S_2, \ldots, S_n$ e.g. by using, for instance, a mathematical function, T-function or a linear or non-linear FSR; generate the pseudonym embryo based on at least one element of the obtained sequence of values $S_1, S_2, \ldots, S_n$.

Figure 4:
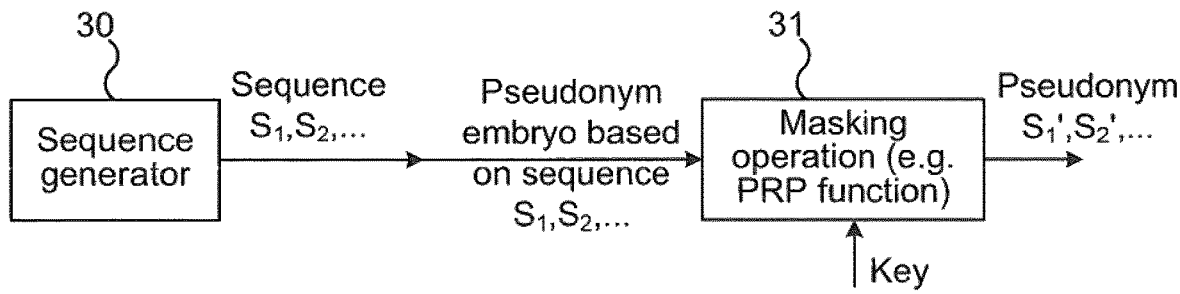
FIG. 4 illustrates generation of a pseudo embryo according to the present teachings.

FIG. 4 illustrates generation of a pseudo embryo according to the present teachings. A sequence generator 30 generates a sequence of values $S_1, S_2, \ldots$ for instance according to the above examples. At least one element of the sequence $S_1, S_2, \ldots, S_n$ is used as the pseudonym embryo. In some embodiments, the sequence generator 30 may output the pseudonym embryo. The pseudonym embryo is input to a masking operation 31, which in the illustrated example is a PRP function 31. The masking operation 31 outputs a pseudonym that is in one-to-one correspondence the pseudonym embryo. The pseudonym is denoted $S_1'$, $S_2', \ldots, S_n'$. By applying, to the input pseudonym embryo, a masking operation which is a one-to-one mapping, there is only one pseudonym matching this pseudo embryo. This is in contrast to prior art, wherein one-way functions, e.g. hash functions, are typically used and wherein thus a value input to the hash function can give the same pseudonym.

For embodiments using PRP, the PRP may be instantiated using a block cipher, for instance the Advanced Encryption Standard (AES), although other implementations are conceivable. The block cipher is a deterministic algorithm operating on fixed-length groups of bits, denoted blocks, with an unvarying transformation that is specified by a symmetric key, and is well suited for use in embodiments of the present teachings. For such embodiments, a key is used, as indicated in the figure.

The PRP may be instantiated using a Luby-Rackoff construction. This well-known construction iterates a pseudo random function to construct a PRP. It starts from a pseudo-random function, g, mapping m bits to m bits. The function g may but need not be one-to-one. Given such g, a pseudo-random, one-to-one mapping is constructed from 2m bits to 2m bits. Thus, for any even n (n=2m) a suitable mapping f from n bits to n bits may be obtained. Owing to its flexible design it is easily adaptable to construct PRPs with different block-lengths. This may be suitable when no existing Mock-cipher exists with suitable Mock-length. A Mock-length is suitable when it equals the required length of the pseudonym.

According to still another aspect, and as mentioned earlier, the PRP is not dynamically keyed, but rather a specific PRP in the PRP family is selected statically in the implementation. A PRP may be seen as a family of functions, each function indexed by a variable. The variable may here be seen as a key. Selecting a key means selecting a specific instance of a PRP (a specific function of the PRP family of functions), wherein the selected instance of the PRP takes an input and outputs a permutation thereof. This may be used when implementing embodiments of the present teachings: a key may be selected and the corresponding instance of the PRP may be hardcoded into a device (or network node), i.e. statically selected.

According to still another aspect of the present teachings, the controlling network node 13 restarts the sequence for obtaining the pseudonym embryos when the number of generated pseudonyms in the sequence has reached a threshold value. The threshold value should be large enough so that the risk for a UE 11 using one of the pseudonyms generated from an early value in the sequence $S_1, S_2, \ldots$ is negligible. The controlling network node 13 may choose a new key for the PRP when restarting the sequence $S_1, S_2, \ldots$ for generating the pseudonym embryo. Such use of a new key may avoid re-generating the pseudonyms in the exact same sequence. However, doing so increases the risk for collision of pseudonyms for UEs assigned pseudonyms before the sequence re-started. If the controlling network node 13 uses multiple keys for the same pseudonym embryo, it may choose to provide an identifier of which key is used together with or as part of the pseudonym, when transmitting it to the UE 11. That is, the pseudonym assigned to the UE 11 may, in some embodiments, comprise an identifier of the used key (a key identifier). The controlling network node 13 may then, upon receiving the pseudonym from the UE 11, decrypt the pseudonym by using the key identifier in order to look up which key the controlling network node 13 itself used when earlier encrypting the pseudonym. That is, the controlling network node 13 is enabled to decide, based on a received pseudonym, which key to use to reconstruct the associated pseudonym embryo.

According to still another aspect of the present teachings, the controlling network node 13 associates the pseudonym embryo with the UE 11.

According to still another aspect of the present teachings, a linear-feedback shift register (LFSR) is used for generating the sequence of values and hence for obtaining the pseudonym embryo. In computing, a LFSR is a shift register whose input bit is a linear function of its previous state. The pseudonym embryo may be obtained by taking the next state the LFSR, preferably but not necessarily with the maximum period, initiated from any non-all-zero state. That is, the sequence of values comprises the states of the LFSR, and the pseudonym embryo is obtained by using the next non-used state. An n-bit LFSR has the maximum non-repeating period of $2^n-1$ if and only if its connection polynomial is primitive. An irreducible polynomial of degree n over finite field GF(2) is called primitive if the smallest positive integer m for which it divides $x^m+1$ is equal to $2^n-1$. An irreducible polynomial is a non-constant polynomial that cannot be factored into the product of two non-constant polynomials. This embodiment is beneficial when implementing the method in hardware since LFSRs have faster and more compact hardware implementations than counters.

According to still another aspect of the present teachings, a Non-Linear Feedback Shift Register (NLFSR) is used for generating the sequence of values and hence for obtaining the pseudonym embryo. A NLFSR is a common component in modern stream ciphers, especially in RFID and smartcard applications. NLFSRs are known to be more resistant to cryptanalytic attacks than LFSRs. The pseudonym embryo may be obtained by taking the next state of, preferably but not necessarily with the maximum period of $2^n$ initiated from any state, or with the nearly maximum period of $2^n-1$, initiated from any non-all-zero state. That is, the sequence of values comprises the states of the NLFSR, and the pseudonym embryo is obtained by using the next non-used state. For small n, NLFSRs with the maximum or nearly maximum period can be found by simulation. For large n, NLFSRs with the maximum or nearly maximum period can be constructed using known algorithms. Such embodiments have a somewhat higher complexity compared to the earlier mentioned embodiments of generating the sequence for the pseudonym embryo.

According to still another aspect of the present teachings, the pseudonym embryo is obtained by taking the next state of a single-cycle T-function, initiated from any state. A T-function is a bijective mapping that updates every bit of the state in a way that can be described as $x_i'=x_i+f(x_0, \ldots, x_{i-1})$, or stated differently: an update function in which each bit of the state is updated by a linear combination of the same bit and a function of a subset of its less significant bits. A known method for constructing single-cycle T-functions which have the maximum period of $2^n$ may be used. Just as for the NLFSR, such embodiments have a somewhat higher complexity compared to the earlier mentioned embodiments of generating the sequence for the pseudonym embryo.

According to still another aspect of the present teachings, the pseudonym embryo contains a part that corresponds to fixed data. For example, the IMSI or part of the IMSI may be included as part of the pseudonym embryo. This may be beneficial if the number of needed pseudonyms is small enough. An advantage provided is that the IMSI part, that is included as part of the pseudonym embryo, may allow the controlling network node 13 to make a policy decision based thereon before looking up the corresponding IMSI in the mapping table. As an example, a policy decision may relate to whether IMSIs with certain bit patterns should get lower priority in service queues during an overload situation. The operator may, for instance, have IMSIs starting with 0101 assigned only for emergency personnel such as fire fighters and police, and the policy decision may then be to always prioritize the UEs having such IMSIs.

The various features and embodiments that have been described may be combined in different ways, examples of which are given in the following, with reference first to FIG. 5.

Figure 5:
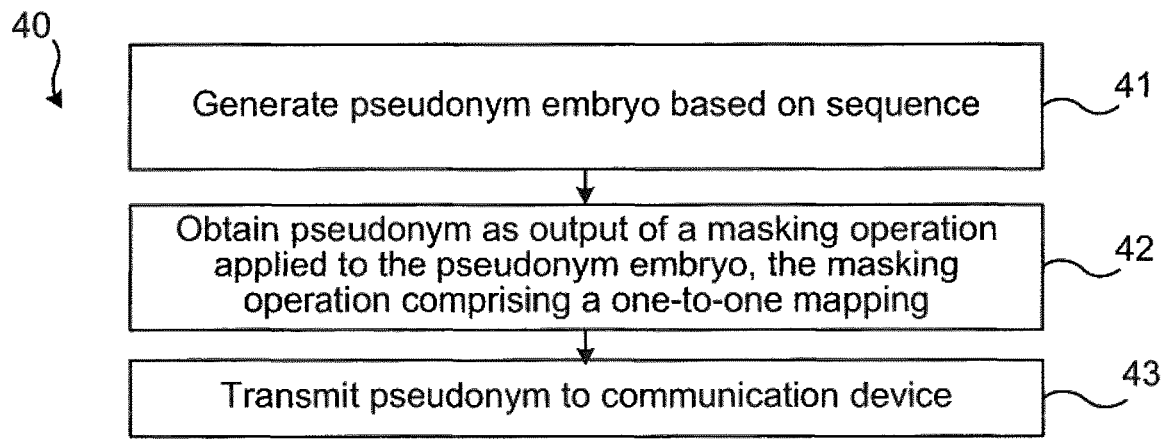
FIG. 5 illustrates a flow chart over steps of a method in a network node in accordance with the present teachings.

FIG. 5 illustrates a flow chart over steps of a method in a network node in accordance with the present teachings. The method 40 of generating a pseudonym associated with a communication device 11 may be performed in a network node 13 of a communications system 10. The communication device 11 may for instance be a wireless device communicating over a radio access network that is part of the communication system 10. As has been described earlier, the network node associates an identifier, e.g. IMSI, with a communication device 11 and also a user (subscriber) thereof. The identifier is in turn associated with a pseudonym, e.g. TMSI, which the communication device 11 uses for identifying itself in the communication system 10. The method 40 hence generates a pseudonym for the communication device 10, or rather generates a pseudonym associated with the communication device 10.

The method 40 comprises generating 41 a pseudonym embryo based on one or more elements of a sequence $S_1, S_2, \ldots, S_n$. As have been described, the sequence $S_1, S_2, \ldots, S_n$ may be generated in various different ways, e.g. using states of a linear or non-linear FSR, using a mathematical function, using a T-function etc. The pseudonym embryo is then generated based on at least one element (or value) of the sequence.

The method 40 comprises obtaining 42 the pseudonym as output of a masking operation applied to the pseudonym embryo, wherein the masking operation comprises a one-to-one mapping. The masking operation may, for instance, comprise a pseudo random permutation operation. The masking operation may comprise several sub-components. The mapping may, for instance, be seen as one such sub-component. In some embodiments, a sub-component of the masking operation may comprise selecting a key for indexing a pseudo random permutation with (as has been described earlier). By the masking operation being a one-to-one mapping, one pseudonym embryo will give only one pseudonym, and conversely, one pseudonym will give only one pseudonym embryo. In either direction thus there is only one possible entity mapping to a certain other entity. The one-to-one mapping uniquely associates one entity with another entity, i.e. here the one-to-one mapping is an association between the pseudonym embryo and the pseudonym. The association is unique in that there is only one particular pseudonym corresponding to a particular pseudonym embryo and vice versa.

The method 40 comprises transmitting 43 the pseudonym to the communication device 11. It is noted that the transmitting 43 the pseudonym to the communication device 11 may be effectuated via one or more other nodes, e.g. from the controlling network node 13 via a radio access point 12 to the communication device 11.

In an embodiment, the method 40 comprises repeating the steps, i.e. repeating the generating 41, the obtaining 42 and the transmitting. In this embodiment, the generation 41 comprises reusing one or more elements of the sequence $S_1, S_2, \ldots, S_n$. As have been described earlier, the controlling network node 13 may choose a new key for the PRP when restarting the sequence $S_1, S_2, \ldots$ for generating further pseudonym embryos. Such use of a new key may avoid re-generating the pseudonyms in the exactly same sequence.

In some embodiments, the values (one or more) of the sequence $S_1, S_2, \ldots, S_n$ are reused only when the number of obtained pseudonyms exceeds a threshold value. The threshold value may be set such that the pseudonym obtained for the pseudonym embryo based on the sequence $S_1, S_2, \ldots, S_n$ is, with high probability, not in use when a pseudonym is obtained for the pseudonym embryo based on the reused sequence $S_1, S_2, \ldots, S_n$. In other words, the threshold value should be large enough so that the risk for a communication device 11 using one of the pseudonyms generated from an early value in the sequence $S_1, S_2, \ldots$ is negligible.

In some embodiments, the sequence $S_1, S_2, \ldots, S_n$ comprises an integer sequence, and the generating 41 comprises using a function having at least one of the integers as input and then basing the embryo sequence on at least one integer of the resulting sequence.

In some embodiments, the method comprises storing an association between the communication device 11 and the pseudonym embryo generated for it or between the communication device 11 and the pseudonym obtained. In still other embodiments, such association may be stored between the communication device and the pseudonym embryo and between the communication device and the pseudonym.

In various embodiments, the generated pseudonym embryo comprises a part corresponding to fixed data. Such fixed data may, for instance, comprise at least part of an identifier associated with the communication device 11. As particular examples, the fixed data may comprise part of the IMSI or other long-term identifier, or it may be a fixed bit sequence used by the operator for indicating priority of the user. Further examples of such fixed data comprise a fixed bit sequence used by the operator for authorizing access to certain services.

In various embodiments, the masking operation comprises a pseudo random permutation operation. The pseudo random permutation operation may for instance comprise a block-cipher or a Luby-Rackoff construction based on a pseudo random function. The masking operation may, in some embodiments, be a keyed permutation operation. In some embodiments, the key is available only to the network node 13.

In various embodiments, the masking operation comprises using a feedback shift register, or wherein the sequence $S_1, S_2, \ldots, S_n$ is generated using a feedback shift register.

In various embodiments, the masking operation comprises using a T-function, or wherein the sequence $S_1, S_2, \ldots, S_n$ is generated using a T-function.

Figure 6:
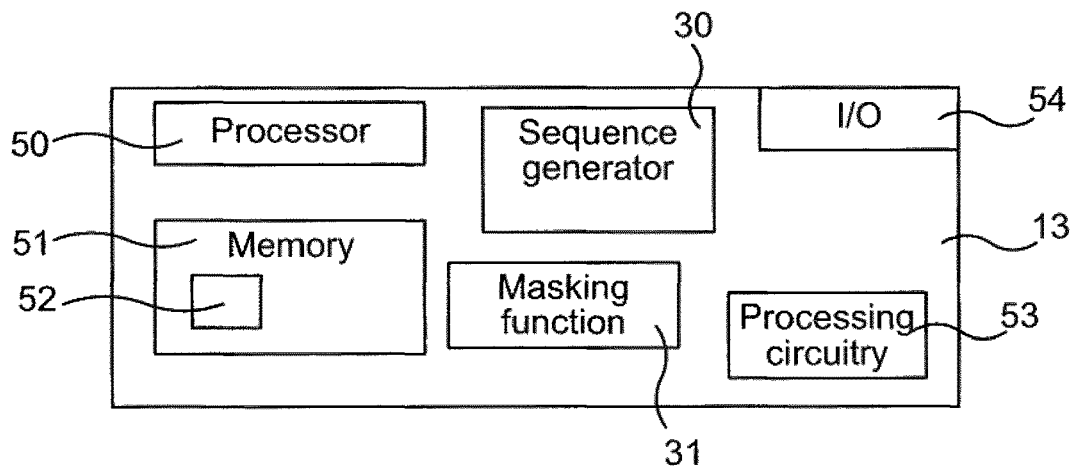
FIG. 6 illustrates a network node, in which embodiments of the method according to the present teachings may be implemented.

FIG. 6 illustrates a network node 13, in which embodiments of the method according to the present teachings may be implemented. The network node 13, e.g. being a server, comprises a processor 50 comprising any combination of one or more of a central processing unit (CPU), multiprocessor, microcontroller, digital signal processor (DSP), application specific integrated circuit etc. capable of executing software instructions stored in a memory 51 which can thus be a computer program product 51. The processor 50 may be configured to execute any of the various embodiments of the method 40 for instance as described in relation to FIG. 5. The memory 51 can be any combination of read and write memory (RAM) and read only memory (ROM), Flash memory, magnetic tape, Compact Disc (CD)-ROM, digital versatile disc (DVD), Blu-ray disc etc. The memory 51 may also comprise persistent storage, which, for example, can be any single one or combination of magnetic memory, optical memory, solid state memory or even remotely mounted memory.

The network node 13 may comprise a sequence generator 30, e.g. as described in relation to FIG. 4. The sequence generator 30 may for instance, and as has been described, comprise a linear or non-linear feedback shift register or a T-function. The sequence generator 30 may output a sequence of values based on which a pseudonym embryo is generated, or it may output the pseudonym embryo directly.

The network node 13 may comprise a masking function 31, e.g. as described in relation to FIG. 4. The masking function 31 may, for instance, comprise a PRP function.

The network node 13 may comprise an interface 54 (indicated as an I/O device in the figure) for communication with other devices. The interface 54 may, for instance, comprise protocol stacks etc., for communication with the other network nodes, e.g. radio access nodes 12 or other access points, gateways etc.

The network node 13 may comprise additional processing circuitry, schematically indicated at reference numerals 53 for implementing the various embodiments according to the present teachings.

The network node 13 may, as mentioned earlier, comprise a MME, MSC, SGSN or the like, in which case the network node 13 comprises also various other functions and features conventionally implemented in such nodes, but not described herein.

A network node 13 is provided for generating a pseudonym associated with a communication device 11. The network node 13 is configured to:

generate a pseudonym embryo based on one or more elements of a sequence $S_1, S_2, \ldots, S_n$, obtain the pseudonym as output of a masking operation applied to the pseudonym embryo, wherein the masking operation comprises a one-to-one mapping, and transmit the pseudonym to the communication device 11.

The network node 13 may be configured to perform the above steps e.g. by comprising one or more processors 50 and memory 51, the memory 51 containing instructions executable by the processor 50, whereby the network node 13 is operative to perform the steps.

In an embodiment, the network node 13 is configured to repeat the generating, the obtaining and the transmitting, and configured to reuse, in the generating, one or more elements of the sequence $S_1, S_2, \ldots, S_n$. In some embodiments, the network node 12 is configured to reuse an element only when the number of obtained pseudonyms exceeds a threshold value.

In various embodiments, the sequence $S_1, S_2, \ldots, S_n$. comprises an integer sequence, and the network node 13 is configured to generate by using a function having at least one of the integers as input.

In an embodiment, the network node 13 is configured to store an association between the communication device 11 and the pseudonym embryo generated for it or between the communication device 11 and the pseudonym obtained. For this purpose, the network node 13 may comprise a memory or database, or be able to access such memory or database provided in another node or entity.

In various embodiments, the generated pseudonym embryo comprises a part corresponding to fixed data. In some embodiment, the fixed data comprises at least part of an identifier associated with the communication device 11.

In various embodiments, the masking operation comprises a pseudo random permutation operation.

In various embodiments, the masking operation comprises a keyed permutation operation.

In various embodiments, the pseudo random permutation operation comprises a block-cipher or a Luby-Rackoff construction based on a pseudo random function.

In various embodiments, the masking operation comprises using a feedback shift register, or wherein the sequence $S_1, S_2, \ldots, S_n$. is generated using a feedback shift register.

In various embodiments, the masking operation comprises using a T-function, or wherein the sequence $S_1, S_2, \ldots, S_n$. is generated using a T-function.

The present teachings also encompass a computer program 52 for a network node 13 for generating a pseudonym associated with a communication device. The computer program 52 comprises computer program code, which, when executed on at least one processor on the network node 13 causes the network node 13 to perform the method 40 according to any of the described embodiments.

The present disclosure also encompasses computer program products 51 comprising a computer program 52 for implementing the embodiments of the method as described, and a computer readable means on which the computer program 52 is stored. The computer program product, or the memory, thus comprises instructions executable by the processor 50. Such instructions may be comprised in a computer program, or in one or more software modules or function modules. The computer program product 51 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 7:
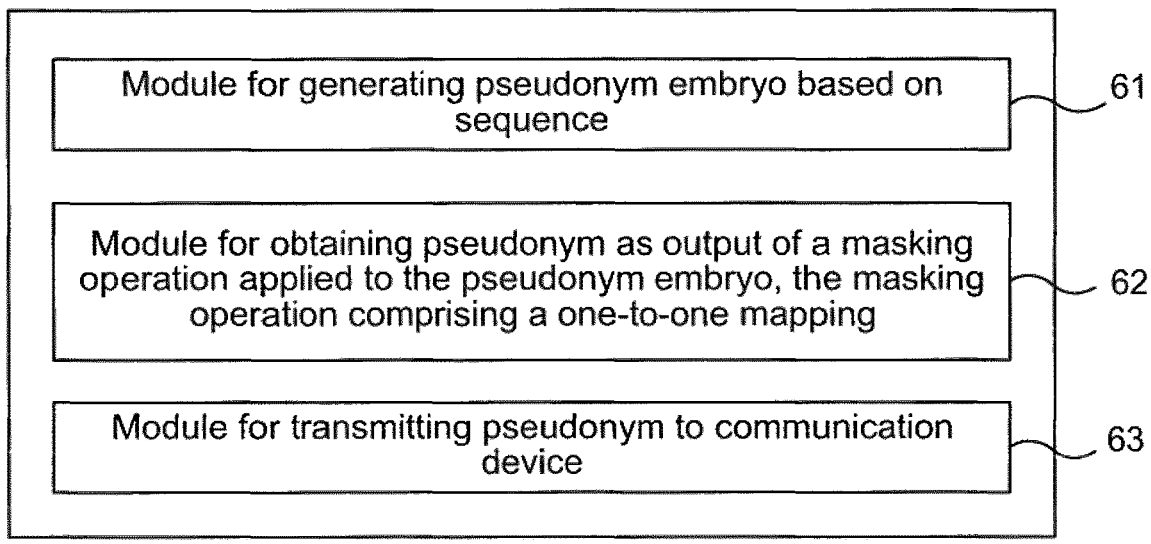
FIG. 7 illustrates a network node comprising function modules/software modules for implementing methods of the present teachings.

FIG. 7 illustrates a network node 13 comprising function modules/software modules for implementing embodiments in accordance with the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described.

A network node 13 is provided of generating a pseudonym associated with a communication device. The network node 13 comprises a first module 61 for generating a pseudonym embryo based on a sequence. Such first module 61 may for instance comprise processing circuitry adapted to generate a pseudonym embryo based on the sequence (e.g. using sequence generator 30 described with reference to FIG. 6).

The network node 13 comprises a second module 62 for obtaining a pseudonym as output of a masking operation applied to the pseudonym embryo, the masking operation comprising a one-to-one mapping. Such second module 62 may for instance comprise processing circuitry adapted for such masking operation.

The network node 13 comprises a third module 63 for transmitting pseudonym to communication device. Such third means module 63 may for instance comprise transmitting circuitry or an interface e.g. as described with reference to FIG. 6.

It is noted that one or more of the modules 61, 62, 63 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for providing privacy, the method being performed in a network node of a communications system and the method comprising:

receiving a message comprising a first subscription identifier;

using a sequence generator to generate a sequence of values;

obtaining one or more values included in the sequence of values;

obtaining a pseudonym embryo based on the obtained one or more values included in the generated sequence of values;

applying a masking operation on the pseudonym embryo, wherein the masking operation comprises a one-to-one mapping;

obtaining a pseudonym as an output of the masking operation applied to the pseudonym embryo;

storing the pseudonym in a memory device such that the pseudonym is associated with the first subscription identifier;

employing a transmitter to transmit the pseudonym to a communication device associated with the first subscription identifier;

reusing the one or more values included in the generated sequence of values to obtain a second pseudonym embryo based on the one or more values;

obtaining a second pseudonym as output of a masking operation applied to the second pseudonym embryo;

storing the second pseudonym in the memory device such that the second pseudonym is associated with a second subscription identifier that is different than the first subscription identifier; and employing the transmitter to transmit the second pseudonym to a second communication device associated with the second subscription identifier.

2. The method of claim 1, wherein the step of reusing the one or more values occurs only after the number of obtained pseudonyms exceeds a threshold value.

3. The method of claim 1, wherein the sequence of values comprises a sequence of integers, and the step of obtaining the pseudonym embryo comprises using a function having at least one of the integers of the sequence of integers as input.

4. The method of claim 1, further comprising storing an association between the first subscription identifier and at least one of the pseudonym embryo or the pseudonym.

5. The method of claim 1, wherein the pseudonym embryo comprises a part corresponding to fixed data.

6. The method of claim 5, wherein the fixed data comprises at least part of an identifier associated with the communication device.

7. The method as claimed in claim 1, wherein the masking operation applied to the pseudonym embryo comprises a pseudo random permutation operation.

8. The method of claim 1, wherein the masking operation applied to the pseudonym embryo comprises a keyed permutation operation.

9. The method of claim 7, wherein the pseudo random permutation operation comprises a block-cipher or a Luby-Rackoff construction based on a pseudo random function.

10. A method for providing privacy, the method being performed in a network node of a communications system and the method comprising:

receiving a message comprising a first subscription identifier;

using a sequence generator to generate a sequence of values;

obtaining one or more values included in the sequence of values;

obtaining a pseudonym embryo based on the obtained one or more values included in the generated sequence of values;

applying a masking operation on the pseudonym embryo, wherein the masking operation comprises a one-to-one mapping;

obtaining a pseudonym as an output of the masking operation applied to the pseudonym embryo;

storing the pseudonym in a memory device such that the pseudonym is associated with the first subscription identifier;

employing a transmitter to transmit the pseudonym to a communication device associated with the first subscription identifier, wherein the sequence generator comprises a feedback shift register (FSR) for producing the sequence of values, or the sequence generator implements a T-function for producing the sequence of values.

11. A computer program product comprising a non-transitory computer readable medium storing a computer program, the computer program comprising computer program code, which, when executed on at least one processor causes the at least one processor to perform a method comprising:

receiving a message comprising a first subscription identifier;

using a sequence generator to generate a sequence of values;

obtaining one or more values included in the sequence of values;

obtaining a pseudonym embryo based on the obtained one or more values included in the generated sequence of values;

applying a masking operation on the pseudonym embryo, wherein the masking operation comprises a one-to-one mapping;

obtaining a pseudonym as an output of the masking operation applied to the pseudonym embryo;

storing the pseudonym in a memory device such that the pseudonym is associated with the first subscription identifier;

employing a transmitter to transmit the pseudonym to a communication device associated with the first subscription identifier;

reusing the one or more values included in the generated sequence of values to obtain a second pseudonym embryo based on the one or more values;

obtaining a second pseudonym as output of a masking operation applied to the second pseudonym embryo;

storing the second pseudonym in the memory device such that the second pseudonym is associated with a second subscription identifier that is different than the first subscription identifier; and employing the transmitter to transmit the second pseudonym to a second communication device associated with the second subscription identifier.

12. A network node for providing privacy, the network node comprising:

memory; and processing circuitry connected to the memory, the processing circuitry comprising one or more processors, wherein the network node is configured to:

obtain a first subscription identifier;

use a sequence generator to generate a sequence of values;

obtain one or more values included in the sequence of values;

obtain a pseudonym embryo based on the obtained one or more values included in the generated sequence of values;

apply a masking operation on the pseudonym embryo, wherein the masking operation comprises a one-to-one mapping;

obtain a pseudonym as an output of the masking operation applied to the pseudonym embryo;

store the pseudonym in a memory device such that the pseudonym is associated with the first subscription identifier;

employ a transmitter to transmit the pseudonym to a communication device associated with the first subscription identifier;

reuse the one or more values included in the generated sequence of values to obtain a second pseudonym embryo based on the one or more values;

obtain a second pseudonym as output of a masking operation applied to the second pseudonym embryo;

store the second pseudonym in the memory device such that the second pseudonym is associated with a second subscription identifier that is different than the first subscription identifier; and employ the transmitter to transmit the second pseudonym to a second communication device associated with the second subscription identifier.

13. The network node of claim 12, wherein the network node is configured to reuse the one or more values only after the number of obtained pseudonyms exceeds a threshold value.

14. The network node of claim 12, wherein the sequence of values comprises a sequence of integer values, and the network node is configured to obtain the pseudonym embryo by using a function having at least one of the integers of the sequence of integers as input.

15. The network node of claim 12, configured to store an association between the first subscription identifier and at least one of the pseudonym embryo or the pseudonym.

16. The network node of claim 12, wherein the pseudonym embryo comprises a part corresponding to fixed data.

17. The network node of claim 16, wherein the fixed data comprises at least part of an identifier associated with the communication device.

18. A method for providing privacy, the method comprising:

obtaining a first pseudonym;

associating the first pseudonym with a first subscription identifier;

transmitting the first pseudonym to a first communication device associated with the first subscription identifier;

obtaining a second pseudonym;

associating the second pseudonym with a second subscription identifier;

transmitting the second pseudonym to a second communication device associated with the second subscription identifier, wherein obtaining the first pseudonym comprises: obtaining a first value included in a sequence of values and using the first value and a one-to-one mapping function to generate the first pseudonym, obtaining the second pseudonym comprises: obtaining a second value included in the sequence of values and using the second value and the one-to-one mapping function to generate the second pseudonym, and the second value follows the first value in the sequence of values.

* * * * *